(No Model.) 2 Sheets—Sheet 1.
W. F. BREWSTER.
HIGH TEMPERATURE THERMOMETER.
No. 365,905. Patented July 5, 1887.
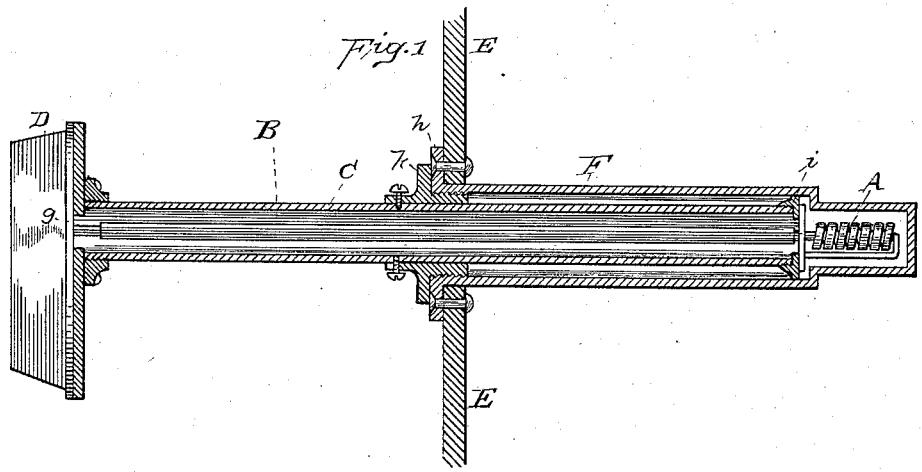
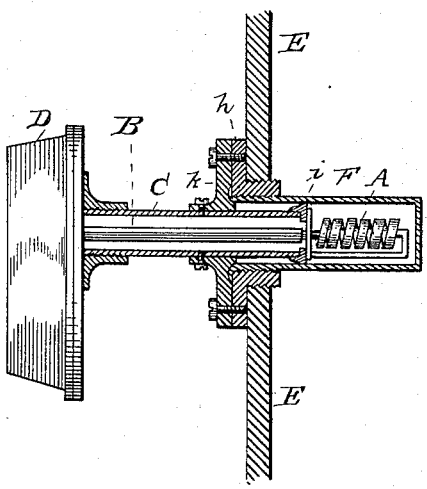
ATTEST:
E. W. Rowland.
Wm. Pfau.
INVENTOR:
William F. Brewster,
By Dyer & Seely
Attys.

(No Model.) 2 Sheets—Sheet 2.
W. F. BREWSTER.
HIGH TEMPERATURE THERMOMETER.
No. 365,905. Patented July 5, 1887.
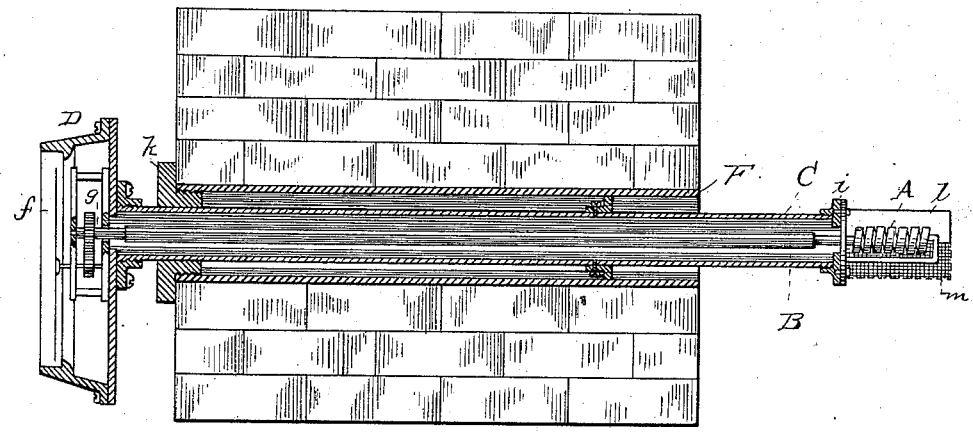
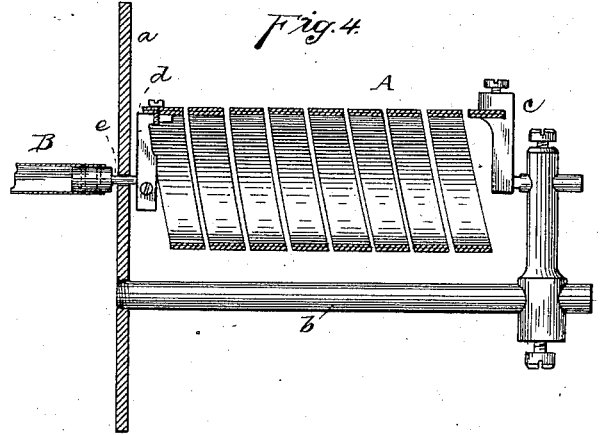
ATTEST:
E. W. Rowland
Wm. Pfizer
INVENTOR:
William F. Brewster,
By Dyer & Seely
Attys.
N. PETERS, Photo-Lithographer, Washington, D. C.

UNITED STATES PATENT OFFICE.

WILLIAM F. BREWSTER, OF EAST ORANGE, NEW JERSEY.

HIGH-TEMPERATURE THERMOMETER.

SPECIFICATION forming part of Letters Patent No. 365,905, dated July 5, 1887.

Application filed November 24, 1886. Serial No. 219,758. (No model.)

*To all whom it may concern:*

Be it known that I, WILLIAM F. BREWSTER, of East Orange, in the county of Essex and State of New Jersey, have invented a certain new and useful Improvement in High-Temperature Thermometers, of which the following is a specification.

The object I have in view is to produce a practical instrument for registering or indicating locally or at a distance the rise and fall of temperature which occur in various forms of industrial apparatus—such as kilns, vulcanizers, mash-tubs, &c.—wherein a high degree of temperature is attained, which would be destructive of delicate and complicated contrivances if subjected to its direct influences, or at least would prevent such contrivances from being accurately operative. It has heretofore been attempted to use for this purpose a compound metallic thermometer located within a protecting-casing at the point of high temperature, and there making electrical contacts for operating electrically at a greater or less distance indicating and registering devices; but it has been found that the extreme heat soon renders such an arrangement inoperative. It has not heretofore been found feasible to transmit the movement of the metallic thermometer to a point of less heat through a direct shaft, since such a shaft as heretofore proposed destroys the delicacy and accuracy of the thermometer if made sufficiently heavy to transmit the motion. I overcome these difficulties by the employment, in connection with the compound metallic thermometer, of a hollow metallic shaft, which I find will give the requisite stiffness for transmitting the motion of the thermometer, and at the same time will be light enough not to impair to a practical extent its accuracy. Such a shaft will not appreciably buckle or bend, and it is not as sensitive as a solid shaft to variations of temperature. I prefer to use a helical bimetallic thermometer which is held stationary at one end and is connected directly with the hollow shaft at its other end. This hollow shaft extends through a suitable protecting-casing to a point of lower temperature, where it operates indicating or registering devices, or both, or makes electrical contacts for operating electrically at a distance such devices, as will be well understood.

The invention further relates to certain features in the construction and arrangement of the protecting-casing, whereby the thermometer and connected parts can be readily removed for repair or renewal at any time without interfering with the operation of the apparatus to which it is attached, and so that the mechanism operated or caused to operate by the thermometer through the medium of the hollow shaft may be removed from the immediate vicinity of the walls of the vessel with which the instrument is connected.

In the accompanying drawings, forming a part hereof, Figure 1 is a view, principally in section, of an instrument embodying my invention applied to a vessel in which a liquid is heated or in which an extremely high temperature is attained; Fig. 2, a similar view of the instrument applied to a vessel in which a less temperature is attained; Fig. 3, a similar view showing the instrument applied to a kiln or dry-heat vulcanizer; and Fig. 4, a sectional view of the thermometer, full size, showing its connection with the hollow shaft.

Like letters denote corresponding parts in all the figures.

A is a helical bimetallic thermometer of well-known construction. It is mounted upon a plate, $a$, from which extends a post, $b$, carrying a clamp, $c$, which holds in a fixed position the outer end of the thermometer. The inner end of the thermometer carries an arm, $d$, projecting inwardly to the axis of the helix, where this arm is secured to a pin, $e$, which passes through the plate $a$ and enters the end of the hollow metallic shaft B, to which it is properly secured. This shaft is a tube of the minimum thickness. A mandrel-drawn tube of German silver I have found suitable for this purpose. The plate $a$ is secured to the inner end of a supporting metal pipe, C, through which the hollow shaft B passes. The outer end of the pipe C carries a box, D, which contains any of the well-known mechanisms for indicating or registering temperature, or both, or for making electrical contacts for controlling a distantly-located indicator or recorder, or both. These mechanisms being well understood, I do not consider it necessary to illustrate or describe them. In Fig. 3 I have, however, shown a simple form of indicator, consisting of a pointer, $f$, traveling over the face of a dial and operated through gears by the hollow shaft. This shaft enters the box D, or a shaft, *g*, projects from the box and is secured to the hollow shaft.

To mount the high-temperature thermometer in position for use, I provide the vessel E, if it is a vessel in which a liquid is heated or an extremely high temperature is attained, with a protecting-casing, F. This is made of metal of tubular form, and is closed at its inner end. It has a flange, *h*, by which it is secured by a tight joint in an opening in the side of the vessel and projects inwardly into the material, so as to reach at its inner end a proper point for finding the heat of the liquid mass. The pipe C, carrying the thermometer A on its end, is introduced into the casing F, a guiding-collar, *i*, keeping the thermometer out of contact with the casing. A second collar, *k*, on the pipe C serves to secure the pipe to the casing and to close the open end of the casing, so as to keep the heat therein.

In case the vessel E is a metallic vessel in which a high temperature is attained—such as an asphalt-tank—it is desirable to remove the mechanism in the box D from the immediate vicinity of the walls of the vessel. For this purpose the supporting-pipe C is extended beyond the collar *k*, so that the box D will be removed sufficiently from the influence of the heat existing at the walls of the vessel E. The depth of the protecting-casing F, as well as its thickness, and the metal of which it is made, whether of iron, brass, or copper, depend upon the particular application of the instrument and the conditions of heat-pressure and character of material heated under which the instrument is to be used.

In Fig. 2 the protecting-casing is represented as a thin copper cap, such as would be used for applying the instrument to a mash-tub or live-steam vulcanizer. It will be seen that the supporting pipe C and the thermometer can be removed from the protecting-casing F for repair or renewal without interfering with the operation of the heating-vessel.

In Fig. 3, which represents the application of the high-temperature thermometer to a kiln, dry-heat vulcanizer, or similar apparatus, the casing F has an open inner end and the supporting tube B projects directly into the kiln, the thermometer being protected by a tin hood, *l*, and a gauze shield, *m*.

What I claim is—

1. In an instrument for indicating and registering high temperatures, in combination with a metallic thermometer and an indicating or registering mechanism, a hollow shaft connected to said thermometer at one end and to the said mechanism at the other end, and transmitting motion from said thermometer to said mechanism, substantially as described.

2. In an instrument for indicating or registering high temperatures, the combination of a bimetallic helical thermometer, an indicating or registering mechanism, a support for said thermometer, and a hollow shaft connected at one extremity to said thermometer and at the other extremity to said mechanism, and transmitting motion from said thermometer to said mechanism, substantially as described.

3. The combination, in an instrument for indicating or registering high temperatures, of an indicating or registering mechanism, a case containing the same, a tube secured at one end to said case, a helical bimetallic thermometer supported outside of the other end of said tube, and a hollow shaft passing through said tube, connected at one end to said thermometer and at the other end to said indicating or registering mechanism, and transmitting motion from said thermometer to said mechanism, substantially as described.

4. The combination, in an instrument for indicating or registering high temperatures, of an indicating or registering mechanism, a case containing the same, a tube secured to said case, a helical bimetallic thermometer supported outside of the other end of said tube, a hollow shaft passing through said tube, connected at one end to said thermometer and at the other end to said indicating or registering mechanism, and transmitting motion from said thermometer to said mechanism, and a casing inclosing said thermometer and a portion of said tube and secured to said tube, substantially as described.

5. The combination, in an instrument for indicating or registering high temperatures, of the case D, indicating or registering mechanism therein, hollow shaft B, connected to said mechanism, tube C, attached to said case, plate *a*, post *b*, clamp *c*, thermometer A, arm *d*, pin *e*, collar *k*, and casing F, having flange *h*, substantially as described.

This specification signed and witnessed this 15th day of November, 1886.

WILLIAM F. BREWSTER.

Witnesses:
WM. PELZER,
W. E. GILMOR.